Nov. 1, 1955
C. CROSS
2,722,641
AUTOMATIC COMPENSATING DEVICE FOR
MANOMETER FOLLOW-UP SYSTEMS
Filed Dec. 12, 1952
2 Sheets-Sheet 1
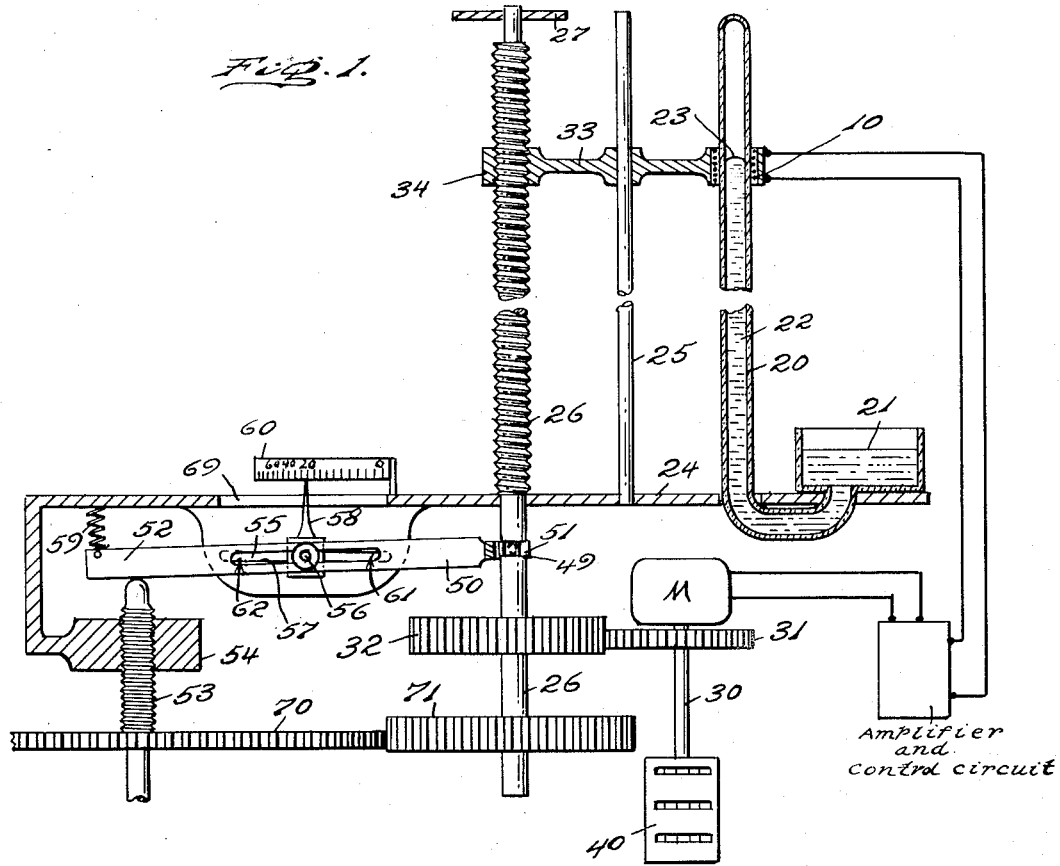
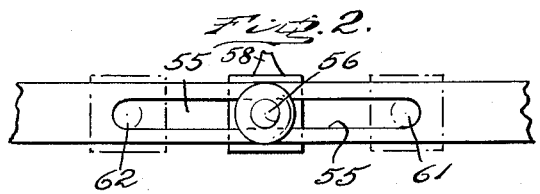
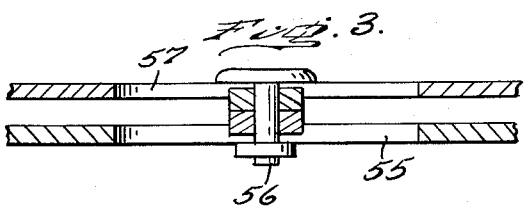
INVENTOR
Charles Cross.
BY
Frank H. Borden
ATTORNEYS.

Nov. 1, 1955     C. CROSS     2,722,641
AUTOMATIC COMPENSATING DEVICE FOR
MANOMETER FOLLOW-UP SYSTEMS
Filed Dec. 12, 1952     2 Sheets-Sheet 2
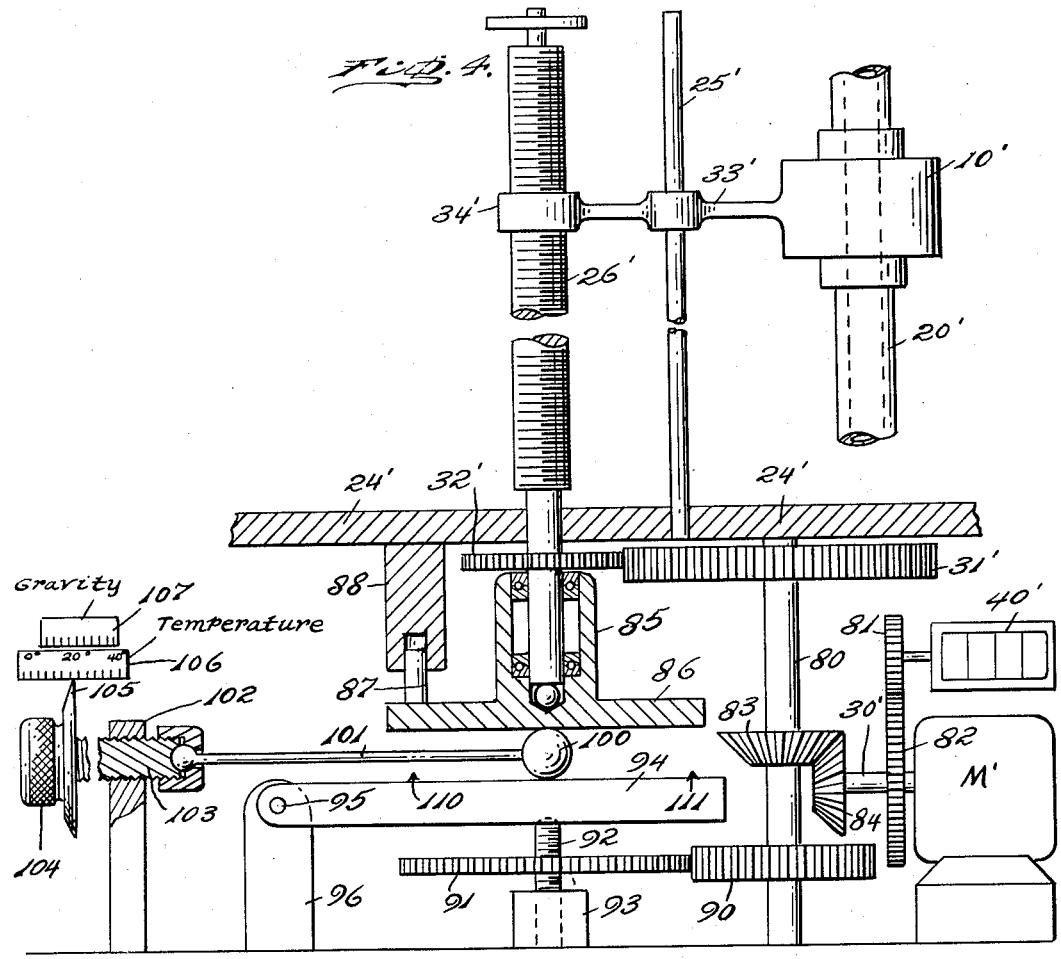
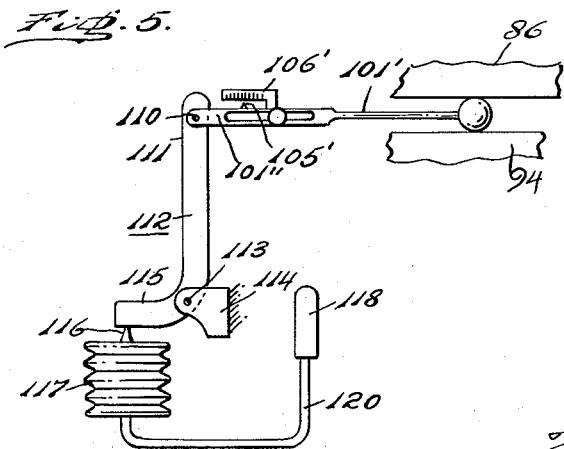
INVENTOR
Charles Cross.
BY
Frank H. Borden
ATTORNEYS.

United States Patent Office 2,722,641
Patented Nov. 1, 1955

2,722,641

AUTOMATIC COMPENSATING DEVICE FOR MANOMETER FOLLOW-UP SYSTEMS

Charles Cross, Philadelphia, Pa., assignor to Automatic Temperature Control Co., Inc., Philadelphia, Pa., a corporation of Pennsylvania Application December 12, 1952, Serial No. 325,727

3 Claims. (Cl. 318—31)

This invention relates to manometers, and particularly to automatic temperature and density compensating devices in a follow-up system for continuously indicating the level of the liquid in a manometer or like tube.

The usual fluid in manometers is mercury, which, as is well known, is of variable density and therefore of variable level with changes in ambient temperature and with gravity changes. For accuracy, therefore, these changes in density must be compensated. Although many efforts have previously been made to automatically indicate the height of the column of mercury with various electrical agencies, with one or more forms of temperature compensation, so far as known the accuracies attained have been of a low order, the expense has been high, and constant service attention has been required to keep the instrument at its proper condition of adjustment.

It is among the objects of this invention to improve the art of manometers; to provide an automatic follow-up system for manometers giving a constant highly accurate indication of manometer level; to provide an automatic temperature compensation for manometers; to provide a temperature and density compensating apparatus for follow-up manometer level-indicating systems by which automatic compensation is made for variations in manometer level for a given ambient temperature at a given latitude, and in which changes of ambient temperature are used to vary the settings of the system, either manually or automatically; to provide means for shifting a threaded shaft axially in movements to effectively change the pitch of the threads thereof in relation to a device positioned thereby; and other objects and advantages will become more apparent as the description proceeds.

The invention herein is directed broadly to any desired follow-up system particularly directed toward the ascertainment and continuous following-up of a variable level in a liquid-containing tube, such as a manometer for the automatic compensation of temperature and density corrections therein.

In the accompanying drawings:

Fig. 1 represents a diagrammatic section of an illustrative manometer tube and follow-up assembly, showing one form of temperature and density compensating system, according to the invention, in which the adjustments are effected manually.

Figs. 2 and 3 are fragmentary details on an enlarged scale of the pivot adjustment for the actuated lever of the compensating system of Fig. 1.

Fig. 4 represents a fragmentary section partially in elevation of a modified but preferred form of temperature compensating device, in which the adjustments are linear in effects for progressive incremental adjustments, and therefore can be automatically as well as manually effected.

Fig. 5 represents a diagrammatic fragmentary elevation of an illustrative ambient temperature responsive device for automatically changing the setting of the compensator of Fig. 4.

In a typical illustrative embodiment of the invention a manometer or like tube of variable liquid level 20, is connected to a suitable reservoir 21, and by means well known in the art the liquid column 22 rises and falls in the tube according to the actuating pressures or other variables affecting the level of the column 22. While in the usual case the liquid in the tube and reservoir is mercury, and will be so assumed herein, the invention is operable with any liquid having variable inductive effects upon a coil surrounding the tube. This may be water, oil, or other chemically available materials, either alone or in combination with induction-increasing constituents. The upper level 23 of the column of liquid 22, assumed herein to be mercury, as noted, is the indicator of the instantaneous pressure or other variable condition to be indicated thereby. It is desired to indicate this level as a continuous indication and signal, and also to indicate deviations of the level by follow-up means as free end 23 rises and falls to restore a datum condition. Restoration of datum continuously effects readings of the level 23. This is a primary objective of the follow-up system.

To this end, on a suitable frame or platform 24, a guide post 25 is mounted rigidly, adjacent and parallel to the vertical manometer tube 20. An "Acme" or like threaded shaft 26 is suitably journalled for rotation as well as guided for vertical axial adjustments, in a frame extension 27 at one end, and is mounted on a vertically adjustable bearing, to be described, toward the other end.

The motor M has a shaft 30 carrying a gear 31 in mesh with a wide gear 32, keyed to the shaft 26 to rotate same proportionally to motor rotations. A coil 10 is mounted on a follower element 33, guided on guide rod 25, and the follower includes a travelling nut element 34 threaded on shaft 26. Coil 10 has an internal bore large enough to slide on manometer tube 20 in a follow-up movement axially of tube 20. The shaft 30 of motor M also actuates a reversible counter device 40 for counting the motor rotations in plus and minus values, to indicate by any instantaneous counter element settings the motor running from zero or datum. The follower 33 is arranged for a full stroke, the length of the column 22 in tube 20 from a zero to a maximum setting.

As it is desired to indicate the location of the upper level 23 of the column of liquid 22, the inductive medium of the column itself can be used for the inductive excitation of the coil 10. The relative positioning of the end 23 of column 22 in coil 10 as it varies runs motor M in one direction or the other to cause the follower 30 traveling on shaft 26 to re-center end 23 in the coil 10 and stop the motor. This can be accomplished in many ways and as the specific circuits for the purpose form no part per se of the present invention, they are omitted.

It is desired to follow-up the level 23 of the liquid 22 automatically. As noted, the follow-up is for the purpose of measuring the vertical variations in the level 23 while returning the system to the datum condition by moving the coil 10 by repositioning follower 33.

It will be understood, as stated, that within the broad purview of the invention the specific follow-up control or actuating system is not important, as this invention deals solely with the compensation factors mentioned. It will be understood, however, that the coil 10 may form part of an inductance bridge, the complemental leg of which contains an insert in inductive relation thereto and extending partially into the said complemental coil. The insert may be a glass or like electrically inert container, containing similar inductive material as the liquid in the tube 20, or may be otherwise related thereto in inductive effects. When the level 23 of the column 22 in tube 20 balances in induction the insert in the complemental tube, the output of the bridge is null and the motor is stationary, running in one direction or the other as the bridge varies with changes in the relative level 23 in coil 10. Coil 10 may be in an oscillator circuit, the frequency of which varies as the relation of column 22 to coil 10. Any other use may be made of the coil 10 for controlling the motor, as may be found expedient.

Therefore, it will be clear that the coil 10 has an effective output usually passing through an amplifier to the motor M, and the running of the latter through the rotations of the shaft 26 moves the follower 33 and its mounted coil 10 axially of the tube 20.

It is, of course, well known that the level of the liquid column 22 varies with its density, and this is particularly of importance when the liquid is mercury. The density of mercury varies not only with the location of the instrument on the earth, in latitude, by reason of the variable effects of gravity on the density thereof, it also varies with the instantaneous temperature changes of the mercury. This is, of course, also true, but to usually smaller degrees with other liquids than mercury. For instance, with a column of mercury 29 inches in height at an illustrative 45 degrees N. Lat., at 20 degrees C., a rise of the temperature to 30 degrees C. increases the height of the column by .1", or to 29.1". This is assuming a density of the mercury as 980.665 at 45 degrees No. Lat. at 0° C. Obviously, this illustrative error is of such magnitude that for accuracy it must be compensated. As the density of the mercury and therefore the height of the column also varies with changes in gravitational effects, the instrument must be set for the particular latitude and even for exaggerated altitudes of the place of use in the determined latitude. These are usually fixed in the instrument, as normally they are not subject to material change in use. However, they should be provided for in the construction of the instrument so that they can be established when ascertained. However, those items which are variables must be continuously compensated if the high accuracies demanded are to be attained.

According to this invention, the variable arising from the varying density due to variations in the temperature incident on the column as it varies is automatically proportionally compensated according to the ratio of compensation attributed to a given temperature situation or setting, with means provided for changing the compensation ratio when the temperature incident on the column varies, and which temperature compensation adjustment may be manual or fully automatic.

Illustratively, the compensation is introduced into the system by changing the vertical axial setting of the screw threaded shaft 26 which controls the follower position as the screw is rotated to move the follower, and thus the follower position is changed with the vertical settings thereof by the shaft to a different setting than mere shaft rotation would effect. The degree of axial shifting of the screw threaded shaft 26 is varied in accordance with the variations in the given or instantaneous temperature of the column.

In the manually adjusted form of the compensating device as shown in Fig. 1, a lever of the first class is provided, as at 50, having a bearing yoke 51 straddling the shaft 26, having inwardly extending arms riding in a peripheral groove 49 in shaft 26 or the like, so as to support same against relative axial movements, while permitting free rotation of the shaft.

Lever 50 is mounted on a fulcrum and has a free end 52 which overlies and is abutted by the upper end of compensating screw 53, threaded through the fixed and relatively stationary nut element 54 mounted on the frame. As will be pointed out, the gearing to be described and the pitch of the threads of the compensating screw and its nut are such that in rotating the shaft through such rotations as will move the follower 33 from zero at the bottom of tube 20 to its ultimate adjusted position at the upper height of the tube, or a movement which normally would be of the order of approximately thirty inches in the case of a manometer, the compensating screw 53 illustratively moves the free end 52 of the lever a mere .2".

The free end 52 is preferably biased toward screw 53 by a compression spring 59.

It will be seen, therefore, that with the fulcrum to be described in the center of the lever 50, so that the lever arms are the same length, the maximum movement of the yoke end of the lever will be .2" It has been pointed out that with a 29" column of mercury at 20° C., a rise of .1" follows an increase of temperature of 10° C. Conversely, a fall of 10° C. would decrease the height of the column of mercury by .1" or to 28.9". Within normal working temperatures to which the manometer would usually be exposed, a range of temperatures of from 0° C. to 40° C. suffices to take care of the proper compensating functions being inserted into the system. A wider range follows from what is disclosed hereinafter. The general rule seems to be that the mercury in a 29" column varies .1" in height for each 10° C. temperature change and this variation decreases linearly as the height of the column decreases. It is desired to incorporate in the system facilities for effecting such changes in compensation.

For establishing a variation in the setting of the fulcrum in the form of device shown in Fig. 1, the lever 50 is provided with a longitudinal lateral slot 55, within which a fulcrum pin 56 is adjustably positioned. The pin is also adjustable in an elongated horizontal slot 57 formed in an extension in the frame and is arranged for anchorage therein, so as to hold the pin as a fixed pivot pin or fulcrum about which the lever 50 swings. The pin 56 either directly or indirectly carries a pointer element 58, which extends through a vertical slot 69 in the frame and overlies the calibrations of a longitudinally adjustable scale 60. Scale 60 is calibrated in terms of temperature having a zero (0° C.) point at the right hand end, as the drawing is viewed, which, as a first principal mark or sub-division, when aligned with the pin 56, as at 61, is of such location relative to the slot 55 as to give .1" motion to the yoke 51, when the free end 52 of the lever 50 is moved .2". From the 0° C. at the right hand end the calibrations are of progressively smaller spacing, and have a generally central second principal mark or sub-division indicative of the mid point or illustrative 20° C. temperature adjustment. This is as has previously been described, a division of the lever into two equal arms so that the yoke 51 moves vertically .2" when the free end 52 moves .2". The spacings between calibrations being non-uniform and, as noted, progressively of smaller spacings or increments, lead to an illustrative third principal calibration, mark, or sub-division at the 40° C. mark. This is a point at which, with the pin 56 aligned therewith as at 62 the lever arms are unequal so that the yoke end 51 moves .3" in response to .2" movement of the free end 52 of the lever. It will be seen that the distance between the mark for 20° C. and 40° C. is smaller than the distance between 20° C. and 0° C. If these distances were the same, the effect of the leverage would be a geometrical function of the change of position of the pin 56, and the movement of the free end 52 of .2" would move the yoke .4", whereas it is usually only desired to move it .3". This non-uniformity of result necessitates either a complicated automatic adjustment, or that these changes be effected manually. Of course, it will be understood that the gradient of calibration spacings takes care of any intermediate temperature conditions for which the device is to be set. It will also be understood that if desired a greater range than from 0° C. to 40° C. can be provided, if desired.

It has been mentioned that the scale 60 is mounted for adjustment longitudinally of the scale. This is to effect a slight displacement of the scale to accord with the latitude and altitude with reference to which the temperature adjustments are to be made in use of the instrument.

In order to automatically compensate for the variations in the height of the column attendant upon temperature changes incident thereon, the threaded shaft or screw 53 is keyed to a gear 70 in constant mesh with a wide gear 71 keyed to the shaft 26. The margin of error increases proportionally as the height of column 22 increases. Starting with a low column 22, such as at zero, with screw 53 at its highest point, so that yoke 51 is at its lowest point, the shaft 26 is, of course, axially at its lowest point. Running of motor M in following the level of column 22 as it rises from zero rotates shaft 26 in such direction as to raise the follower 33 and the coil 10 relative to the column of liquid 22. The gearing turns threaded shaft 53 in such manner as to retract it from under the free end 52 of the lever, permitting the shaft 26 to rise under the influence of the spring bias 59 on lever 50. This raises the shaft 26 and its associated elements proportionally by increments for each rotation to the proper degree to compensate for the false indication of the upper level 23, as a function of the instant temperature setting. Conversely, as the proportional margin of error is less as the height of the column is less, starting with a high column 22, the previously retracted threaded shaft 53 is turned to bear upwardly against the free end 52 of the lever 50, which lowers the supporting yoke end 51 in a degree depending upon the setting of the fulcrum pin 56, to lower the shaft 26 to effect a compensation linearly decreasing as the column height decreases. As noted, when the column is of zero height the shaft 26 is at its highest point and the setting of the follower element 33 and coil 10 is at zero height.

In the preferred form of the invention shown in Fig. 4, the parts are similar to those already described, at least in part. Thus, the frame or platform 24' of the device mounts a guide post 25' upon which the slidably guided follower element 33' is mounted having the coil assembly 10' surrounding the tube 20'. The follower 33' has a threaded nut end 34' movable vertically on the threads of a threaded shaft 26'. The latter shaft carries a gear 32' in mesh with a wide gear 31" on a stub or jack shaft 80. Motor M' has a drive shaft 30' driving the counter 40' through gears 81 and 82, and through bevelled gears 83 and 84 drives the jack shaft 80. The lower end of the shaft 26' is mounted in a step bearing 85 mounted on a plate 86 held against rotation by the stud 87 extending into a bore in a boss 88 mounted on the frame 24'.

The jack shaft 80 also mounts a wide gear 90 in mesh with a gear 91 mounted on a threaded compensating shaft or screw 92 threaded into a boss 93. The upper free end of the shaft 92 bears against the lower surface of a lever 94 of the second class, so as to raise and lower same, and the lever 94 is pivoted at one end at 95 to a stud 96 on the frame. In order to vary the leverage a ball 100 is provided for disposition between lever 94 and the foot plate 86. Ball 100 is displaced diametrically of the axis of the shaft 26' by means of a rod 101 fixed to the ball at one end and universally pivotally mounted in the end of a threaded adjusting screw 103 threaded in a post 102. The axial movement of the screw 103 is controlled by the knob 104 having an indicating marginal rim 105 and traveling axially with the screw, with reference to an evenly calibrated linear scale 106 suitably mounted on the frame. The latter is the temperature scale, and it is disposed for longitudinal shifting adjustment relative to a fixed scale 107, calibrated in terms of varying latitudes and altitudes, in both directions from an illustrative center mark indicative to 45° N. Lat., so that the starting position of the zero mark of the scale 106 can be established in the field.

It will be observed that the linkage described enables the use of a temperature scale of even spacing of all graduations, as the progressive positioning of the ball from one edge of the plate 86 diametrically to the other edge thereof effects a linearly progressing or diminishing ratio of adjustment of the shaft 26' to a given predetermined adjustment of the screw 92. In this case the 0° C. marking is at the left in Fig. 4, at which the ball 100 is at the extreme left of the axis of the shaft 26', at which for a given lever motion, say, of the illustrative .2" of motion of the upper end of the adjusting screw 92, the ratio is two to one. That is, with the said .2" movement the linkage imparts .1" vertical motion to the shaft 26'. The median marking of 20° C. is in the center of the scale, at which point the ball is aligned with the axis of shaft 26', and the ratio is two to two, that is, with the adjusting screw moved .2" the shaft is moved .2". The final extreme setting is with the ball at the extreme right hand side of the disc 86, at the 40° C. mark, at which the ratio is two to three, in which for a screw movement of .2" the shaft movement is .3". Of course, these are illustrative merely, depending upon the requirements of the particular system and the situation for the particular ratios and amplitudes of movements.

While it will be seen that in Fig. 4 the illustrative disclosure is disposed for manual adjustments and setting, owing to the linearity of the adjustments for proportional effects, it will be clear that the device of Fig. 4 lends itself to automatic adjustment. A purely illustrative automatic adjustment of the system of Fig. 4 is schematically shown in Fig. 5.

Referring to Fig. 5, the plate 86 and lever 94 are shown in fragmentary form, and the ball 100 is mounted on a rod 101' of variable length. The length of the rod can be varied in various ways, as by a turnbuckle, or, as shown, by varying overlap with a short rod 101", carrying a pointer 105', with the corresponding scale 106' mounted on the rod 101'. By a suitable slot and pin assembly the rods 101' and 101" are clamped together in rigid coextension to adjust the instant compensating value to the instant latitude and altitude situation in which the instrument is to be used.

The outer or free end of the rod extension 101" is pivoted at 110 to the arm 111 of a bell crank lever 112. The latter is pivoted at 113 to a lug 114 on the frame and the other arm 115 thereof is disposed over the pointer or edge 116 of a bellows 117. A bulb 118 is provided exposed to ambient air adjacent to the instrument so that both are exposed to substantially the same temperature conditions, and the conduit 120 is disposed in communication between the bellows and the bulb. The assembly is suitably spring biased so that the short arm 115 of the bell crank lever remains in contact with the bellows pointer 116 in all positions of retraction thereof. The assembly is calibrated and so proportioned in linkage that the ball 100 is adjusted diametrically of the plate 86 as the temperature on bulb 118 and therefore the pressure in the bellows varies.

The construction and operation of the invention will be apparent as will the fact that modifications and changes may be made in the device without departing from the spirit of the invention. It will further be understood that the invention is susceptible to wider uses than in the particular follow-up system disclosed, being adapted to the effective changes of pitch of a threaded shaft in various mechanical adaptations thereof, to good advantage. Thus, for purely illustrative instance, if it is desired to effect a change of pitch of a threaded shaft so as to cut a thread of a different pitch from the thread of the actuating threaded shaft, in which the follower or traveler on the shaft controls the cutting tool, or like assemblies, it will be apparent that the same compensating system as disclosed can be effected to effectively progressively elongate the threaded shaft by moving same axially as a function of the travel of the traveler thereon and thus effect a more or less slight increase or decrease in the pitch of the turned thread.

Many other forms of utilization of the invention will occur to those skilled in the art.

Having thus described my invention, I claim:

1. A manometer system comprising a manometer tube containing a liquid column having an upper end of variable level, signalling means juxtaposed to the tube and having a datum relation to said upper end at which it emits substantially no effective signal and emits an effective signal with relative departures of the means from said datum relation, a motor, means coupling the signalling means and motor to run the motor with emission of an effective signal from the signalling means, a threaded shaft substantially parallel to the tube containing said column, means mounting the shaft for rotation and for axial shift bodily in translation, driving means between the motor and the shaft, a threaded follower on the shaft mounting said signalling means, said follower having a predetermined movement axially of the shaft longitudinally of said tube in response to a predetermined number of motor-actuated rotations of the shaft when the latter is axially stationary, and means responsive to running of the motor for effecting an axial bodily shift of the shaft to move the follower in space to a different location longitudinally of the tube than it would attain with the same motor running with the shaft axially stationary in which the means for effecting axial bodily shift of the shaft comprises supporting means, a threaded member having an abutting end and disposed on said supporting means for axial movement thereon in response to rotation, driving means between the motor and said member, a lever pivoted on the support having a surface engaged by said abutting end of said member to move the lever on the support with movements of the member, and an operative connection between the lever and said shaft for axially shifting same with movements of the lever at a given ratio of movement of the member to movement of the shaft.

2. A manometer system comprising a manometer tube containing a liquid column having an upper end of variable level, signalling means juxtaposed to the tube and having a datum relation to said upper end at which it emits substantially no effective signal and emits an effective signal with relative departures of the means from said datum relation, a motor, means coupling the signalling means and motor to run the motor with emission of an effective signal from the signalling means, a threaded shaft substantially parallel to the tube containing said column, means mounting the shaft for rotation and for axial shift bodily in translation, driving means between the motor and the shaft, a threaded follower on the shaft mounting said signaling means, said follower having a predetermined movement axially of the shaft longitudinally of said tube in response to a predetermined number of motor-actuated rotations of the shaft when the latter is axially stationary, and means responsive to running of the motor for effecting an axial bodily shift of the shaft to move the follower in space to a different location longitudinally of the tube than it would attain with the same motor running with the shaft axially stationary in which the means for effecting axial bodily shift of the shaft comprises supporting means, a threaded member having an abutting end and disposed on said supporting means for axial movement thereon in response to rotation, driving means between the motor and said member, a lever pivoted on the support having a surface engaged by said abutting end of said member to move the lever on the support with movements of the member, an operative connection between the lever and said shaft for axially shifting same with movements of the lever at a given ratio of movement of the member to movement of the shaft, and means for changing the given ratio.

3. A manometer system comprising a manometer tube containing a liquid column having an upper end of variable level, signalling means juxtaposed to the tube and having a datum relation to said upper end at which it emits substantially no effective signal and emits an effective signal with relative departures of the means from said datum relation, a motor, means coupling the signalling means and motor to run the motor with emission of an effective signal from the signalling means, a threaded shaft substantially parallel to the tube containing said column, means mounting the shaft for rotation and for axial shift bodily in translation, driving means between the motor and the shaft, a threaded follower on the shaft mounting said signalling means, said follower having a predetermined movement axially of the shaft longitudinally of said tube in response to a predetermined number of motor-actuated rotations of the shaft when the latter is axially stationary, and means responsive to running of the motor for effecting an axial bodily shift of the shaft to move the follower in space to a different location longitudinally of the tube than it would attain with the same motor running with the shaft axially stationary in which the means for effecting axial bodily shift of the shaft comprises supporting means, a threaded member having an abutting end and disposed on said supporting means for axial movement thereon in response to rotation, driving means between the motor and said member, a lever pivoted on the support having a surface engaged by said abutting end of said member to move the lever on the support with movements of the member, an operative connection between the lever and said shaft for axially shifting same with movements of the lever at a given ratio of movement of the member to movement of the shaft, said operative connection comprising a plate concentric with said shaft, a transmitting element disposed between said plate and said lever, and means for moving the transmitting element to various settings relative to the axis of said shaft transverse of said plate to change the given ratio.

References Cited in the file of this patent

UNITED STATES PATENTS

| | | |
|---|---|---|
| 2,357,745 | Kliever | Sept. 5, 1944 |
| 2,542,671 | Hass | Feb. 20, 1951 |

OTHER REFERENCES

"Electronics," vol. 24, No. 5, May 1951, pp. 126–129.